US009183652B2

(12) United States Patent
Hasselgren et al.

(10) Patent No.: US 9,183,652 B2
(45) Date of Patent: Nov. 10, 2015

(54) VARIABLE RASTERIZATION ORDER FOR MOTION BLUR AND DEPTH OF FIELD

(71) Applicant: Intel Corporation, Santa Clara, CA (US)

(72) Inventors: Jon N. Hasselgren, Bunkeflostrand (SE); Tomas G. Akenine-Moller, Lund (SE); Carl J. Munkberg, Malmo (SE); Franz P. Clarberg, Lund (SE); Jim K. Nilsson, Lund (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,452

(22) PCT Filed: May 15, 2013

(86) PCT No.: PCT/US2013/041122
§ 371 (c)(1),
(2) Date: Jun. 4, 2013

(87) PCT Pub. No.: WO2014/185900
PCT Pub. Date: Nov. 20, 2014

(65) Prior Publication Data
US 2015/0154772 A1    Jun. 4, 2015

(51) Int. Cl.
*G06T 5/00*    (2006.01)
*G06T 15/00*   (2011.01)
*G06T 11/40*   (2006.01)
*G06T 7/00*    (2006.01)
*G06T 7/40*    (2006.01)

(52) U.S. Cl.
CPC .............. *G06T 11/40* (2013.01); *G06T 7/0059* (2013.01); *G06T 7/407* (2013.01); *G06T 15/005* (2013.01)

(58) Field of Classification Search
CPC combination set(s) only.
See application file for complete search history.

(56) References Cited

U.S. PATENT DOCUMENTS

| 6,215,500 | B1* | 4/2001 | Deering | 345/426 |
|---|---|---|---|---|
| 6,256,041 | B1* | 7/2001 | Deering | 345/426 |
| 7,301,537 | B2 | 11/2007 | Strom | |
| 8,212,815 | B2 | 7/2012 | Sugama | |
| 8,300,045 | B2 | 10/2012 | Kim | |
| 2002/0030677 | A1* | 3/2002 | Huang et al. | 345/420 |
| 2004/0125103 | A1* | 7/2004 | Kaufman et al. | 345/419 |
| 2004/0207642 | A1* | 10/2004 | Crisu et al. | 345/626 |
| 2009/0146999 | A1* | 6/2009 | Kim | 345/420 |
| 2010/0066744 | A1* | 3/2010 | Xianghui et al. | 345/441 |
| 2010/0328303 | A1* | 12/2010 | Akenine-Moller et al. | 345/419 |
| 2012/0274636 | A1 | 11/2012 | Akenine-Moller | |
| 2013/0181991 | A1* | 7/2013 | Nilsson et al. | 345/422 |
| 2014/0035940 | A1* | 2/2014 | Kirill | 345/582 |

OTHER PUBLICATIONS

PCT International Search Report and Written Opinion issued in corresponding PCT/US2013/041122 dated Feb. 24, 2014, (10 pages).

* cited by examiner

*Primary Examiner* — Wesner Sajous
(74) *Attorney, Agent, or Firm* — Trop, Pruner & Hu, P.C.

(57) ABSTRACT

Cache thrashing or over-accessing of a cache can be reduced by reversing the order of traversal of a triangle on different granularities. In the case where triangles are not grouped, the traverse order may be reversed on each triangle. In cases where triangles are grouped, the traversal order may be reversed with each group change. However, when motion is excessive, for example beyond a threshold, then the traversal order reversal may be disabled.

29 Claims, 5 Drawing Sheets

VARIABLE RASTERIZATION ORDER FOR MOTION BLUR AND DEPTH OF FIELD

BACKGROUND

This relates to graphics processing and, particularly, to rendering motion blur and depth of field.

Correct rendering of distributed effects such as motion blur and depth of field in interactive graphics will be a major leap towards increased realism and visual fidelity. Most applications currently make the assumptions that the scene is seen through a pinhole camera with a shutter that is open for an infinitesimally short amount of time, and rely on post-processing to create the desired blur. Although several rasterization algorithms that stochastically sample (i.e., sample at non-uniformly spaced locations) in time and over the lens have been proposed, they all suffer from unpredictable performance and poor scaling with increased blur. By sacrificing the stochastic property and discretizing time and lens coordinates using accumulation buffering or interleaved sampling, a constant cost can be achieved, but this may introduce so called strobing artifacts.

In real-time graphics there is a prevailing trend towards using smaller primitives. This was emphasized with the introduction of tessellation in the Direct3D 11 graphics API, which made it possible to generate a large amount of geometry on chip. However, smaller primitives put a high pressure on the rasterizer, and make shading less efficient due to the constraint of shading on 2×2 quads (in order to support finite differences). The problem is reinforced with accumulation buffering or interleaved sampling, as these techniques can be seen as rendering each primitive multiple times, and in the case of interleaved sampling, in lower resolution (i.e., more sparsely sampled). Also, the amount of blur introduced by motion and/or depth of field is independent of the geometric detail of the scene. Hence, stochastic rasterization of small primitives is exceedingly expensive, as the screen-space region that needs to be traversed for each blurred primitive is very large compared to the size of the primitive. A large amount of work is performed that does not result in visible samples.

BRIEF DESCRIPTION OF THE DRAWINGS

Some embodiments are described with respect to the following figures.

DETAILED DESCRIPTION

Cache thrashing or over-accessing of a cache (e.g. color, texture, or z buffer caches) can be reduced by reversing the order of traversal of a triangle on different granularities. In the case where triangles are not grouped, the traversal direction or order may be reversed on each successive triangle. In cases where triangles are grouped, the traversal order may be reversed with each group change. However, when motion is small, for example below a threshold, then the traversal order reversal may be disabled.

Figure 1:
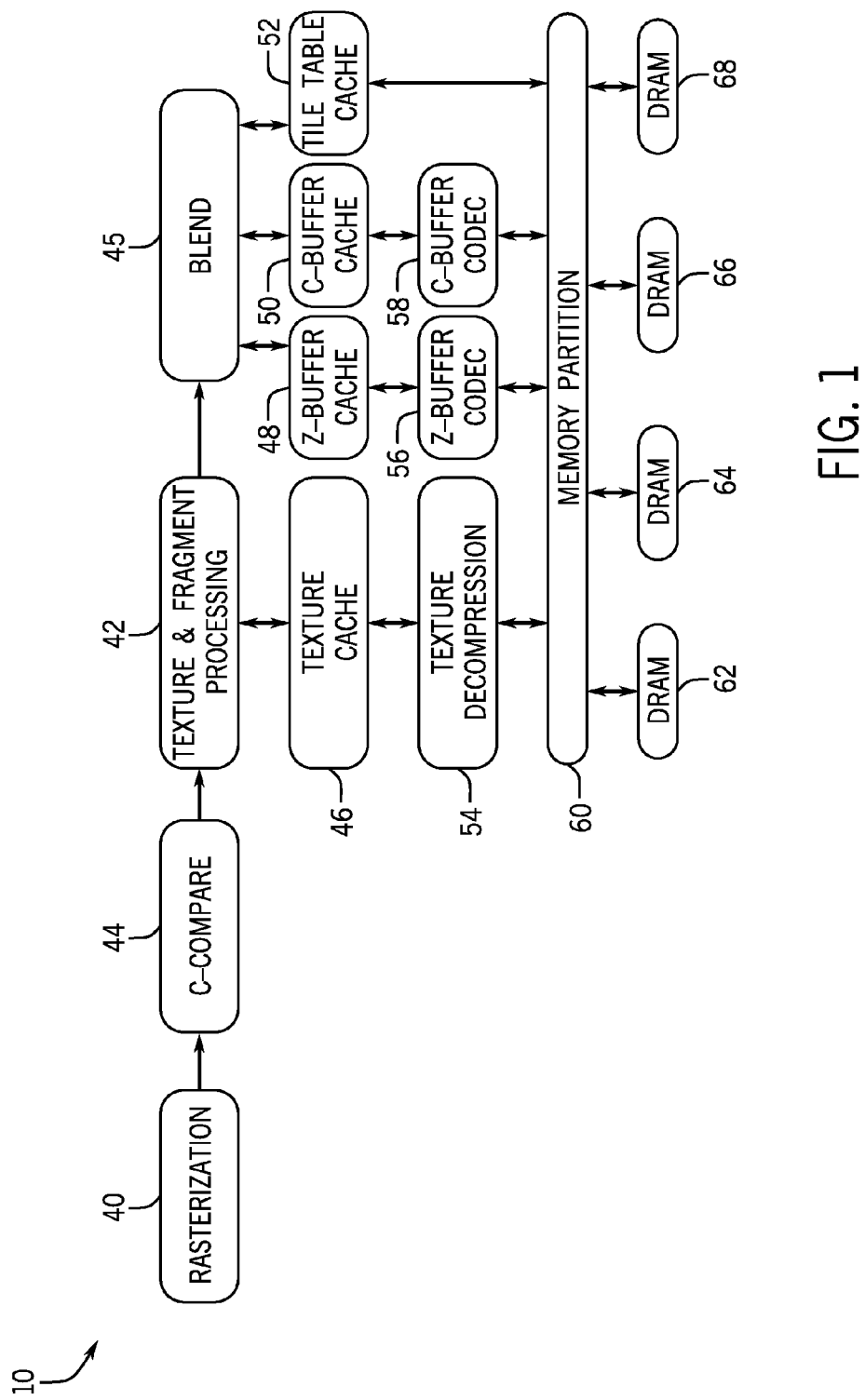
FIG. 1 is a schematic depiction of one embodiment.

In FIG. 1, a graphics processor 10 may include a rasterization pipeline including a rasterization unit 40, a depth or Z compare unit 44, a texture and fragment processing unit 42, and a blend unit 45. Each of these units may be implemented in whole or in part by software or hardware in some embodiments. In some embodiments, the Z compare unit 44 is after the texture and fragment processing unit 42 in the pipeline and, in some cases, the order of the operations are selectable.

The texture and fragment processing unit 42 is coupled to a texture cache 46. The cache 46 is in turn coupled to a memory partition 60 through a texture decompression module 54. Thus, texture information stored in the cache may be decompressed between the memory partition and the cache.

The blend unit 44 is coupled to a depth buffer cache 48. The blend unit 45 is coupled to a color buffer cache 50 and a tile table cache 52. In turn, the depth buffer cache 48 is coupled to the memory partition 60 through the depth buffer coder/decoder (codec) 56. Likewise, the color buffer cache 50 couples the memory partition 60 through the color buffer coder/decoder (codec) 58. The memory partition 60 may be coupled to dynamic random access memory (DRAM) 62, 64, 66 and 68 which may be part of system memory. In some embodiments, a unified cache may be used that includes the texture cache, the depth buffer cache and the color buffer cache. In some embodiments, several levels of caches are used.

In some embodiments, a unified codec may replace the units 54, 56, and 58. Various configurations are described in further detail in the article, *Floating Point Buffer Compression in a Unified Codec Architecture* by Ström, et al. Graphics Hardware (2008).

Motion blur and depth of field rasterization changes the access patterns to color and Z buffers from standard (static triangle) rasterization. For scenes with many small triangles and large motion, each triangle sweeps a large area in screen space. The effect is especially pronounced if the triangle is also blurred because it is out of focus. Especially with triangles that are motion blurred and out of focus, a large number of tiles are accessed during rasterization, potentially only updating a few samples in each tile. This can cause cache over-access or thrashing unless a very large cache is used. Use of a very large cache tends to be expensive.

Figure 2:
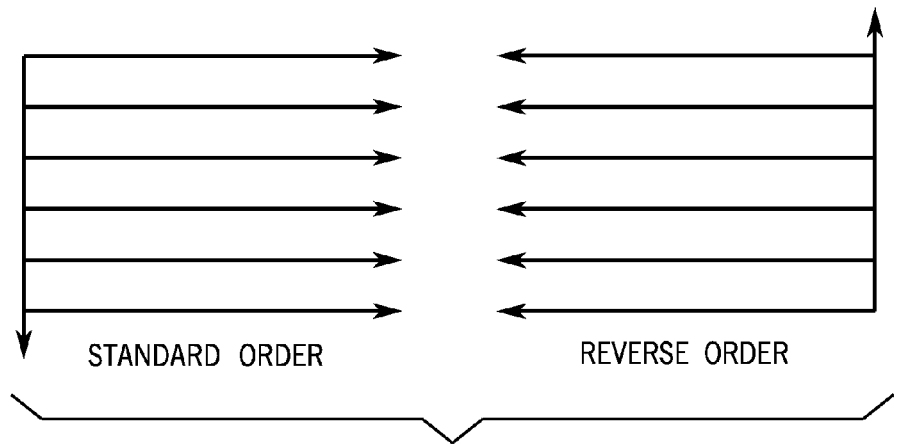
FIG. 2 is a depiction of one embodiment using scan line triangle traversal.
Figure 3:
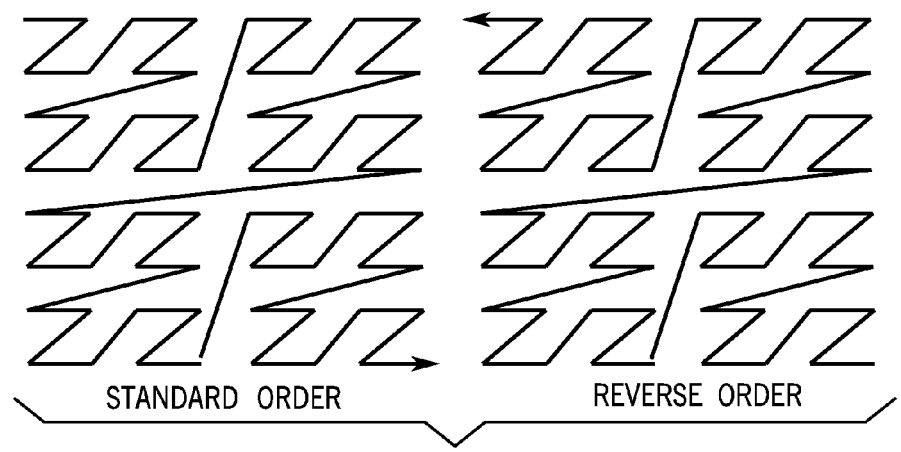
FIG. 3 is a depiction of one embodiment using Morton triangle traversal.

By changing the traversal order such that tiles more likely to be in the cache are traversed first, cache thrashing may be reduced in some embodiments. By reversing the traversal order with fast moving triangles, a more coherent access pattern in buffer caches may be achieved in some embodiments. For standard rasterization, the overlap between triangles' screen space bounding boxes is relatively modest. For standard rasterization with static triangles and therefore no motion blur, it makes sense to use the same traversal order for all triangles. For example, the triangles may be traversed in a tile-based order left to right, and up and down (as shown in FIG. 2), or along a Morton curve (as shown in FIG. 3). After a first triangle, the traversal for a consecutive triangle is relatively close to where the first triangle finished its traversal and the frame buffer data will most likely be resident in the cache.

However, when motion is added to the triangle mesh, the bounding boxes start to grow as well as overlap heavily. When motion gets large enough, the traversed screen space area can no longer fit in the cache. Furthermore, since there is such a large overlap between bounding boxes, the screen space position where traversal started for the second triangle may no longer be close to the screen space position where traversal of the first triangle ended.

By reversing the traversal order each time rasterization of a new triangle begins, cache thrashing may be reduced in some embodiments. Depending on the rasterization technique and its standard traversal order, the implementation of the reversed order may vary. Referring to FIG. 2, a standard scan line traversal order is shown on the left and a reversed scan line traversal order is shown on the right. Thus, a standard order may be used for the first triangle and the reverse order implemented for the second triangle with the traversal order alternating on each new triangle.

Similarly, the standard Morton traversal order is shown on the left in FIG. 3 and the reversed order is shown on the right in FIG. 3. Again, the first triangle may be in the standard order, the next triangle in the reversed order, and then the traversed order is reversed on each subsequent triangle.

In some embodiments it may be desirable to disable the traversal reversal based on the magnitude of motion. For example, if the motion is very small relative to the triangle's bounding box, the traversal reversal may be disabled. For example if the motion is below a threshold, the reversal of rasterization order may be disabled until the motion is larger. As soon as the motion is relatively large relative to the bounding box, for example greater than the threshold, then the alteration between standard and reverse traversal orders may be reinstituted.

Alternating traversal order also helps to reduce the bandwidth for static triangles that are long and narrow. This geometry may cause a similar problem to that created by motion blur where each triangle occupies a large region in screen space. Similar to the motion blur case, alternating of traversal order may be selectively enabled based on the geometry of the triangles.

Some rasterizers use a snake-like tile traversal. For example the traversal may start in the tile containing the topmost vertex (i.e., the leftmost of these if more than one has the same y coordinate). Traversal then continues in an arbitrary horizontal direction (for example to the right), and traverses in that direction until the tile is found that is outside the triangle, or the current tile lies outside the bounding box. Traversal then continues on to the row of tiles below using different strategies. However, a common trait for all snake-based techniques is that they swap the traversal direction after every row of tiles. Applying a traversal reversal to the snake-based technique, traversal starts from the bottommost vertex every other triangle and the left right order is reversed.

With motion and defocus blur rasterization, each blurred triangle often occupies a large region on the screen, while only a few of the tested samples per pixel overlaps with the pixel and are shaded and written to the color and depth buffer. To increase coherence and memory locality, groups of triangles may be rasterized together. For example, groups of triangles may be rasterized by means of building a hierarchical data structure. Even rasterizing pairs of triangles together may lead to significant savings. Thus, according to one embodiment, n triangles may be rasterized at a time and all n triangles may be rasterized for each tile, before moving onto the next tile and so on.

In some embodiments, the traversal order may be changed after each group of n triangles. For each group, all tiles in the group's bounding box are traversed in a chosen order, such as a standard or Morton order tile traversal. For the next group, the traversal order is reversed and so on. Since the bounding box of a group of triangles usually occupies a much larger screen space area than an individual triangle, some savings in cache utilization may be achieved in some embodiments.

In some embodiments, the traversal order is determined individually for each triangle, or group of triangles, based on several different rules. For example, the size, orientation, amount of motion, amount of defocus blur, and traversal order used for the previous triangle may be used to select an appropriate traversal order for the current triangle or group of triangles.

In some embodiments, heuristics are used to estimate the potential gain of each traversal method, in order to choose the most efficient traversal of each triangle or group of triangles.

Figure 4:
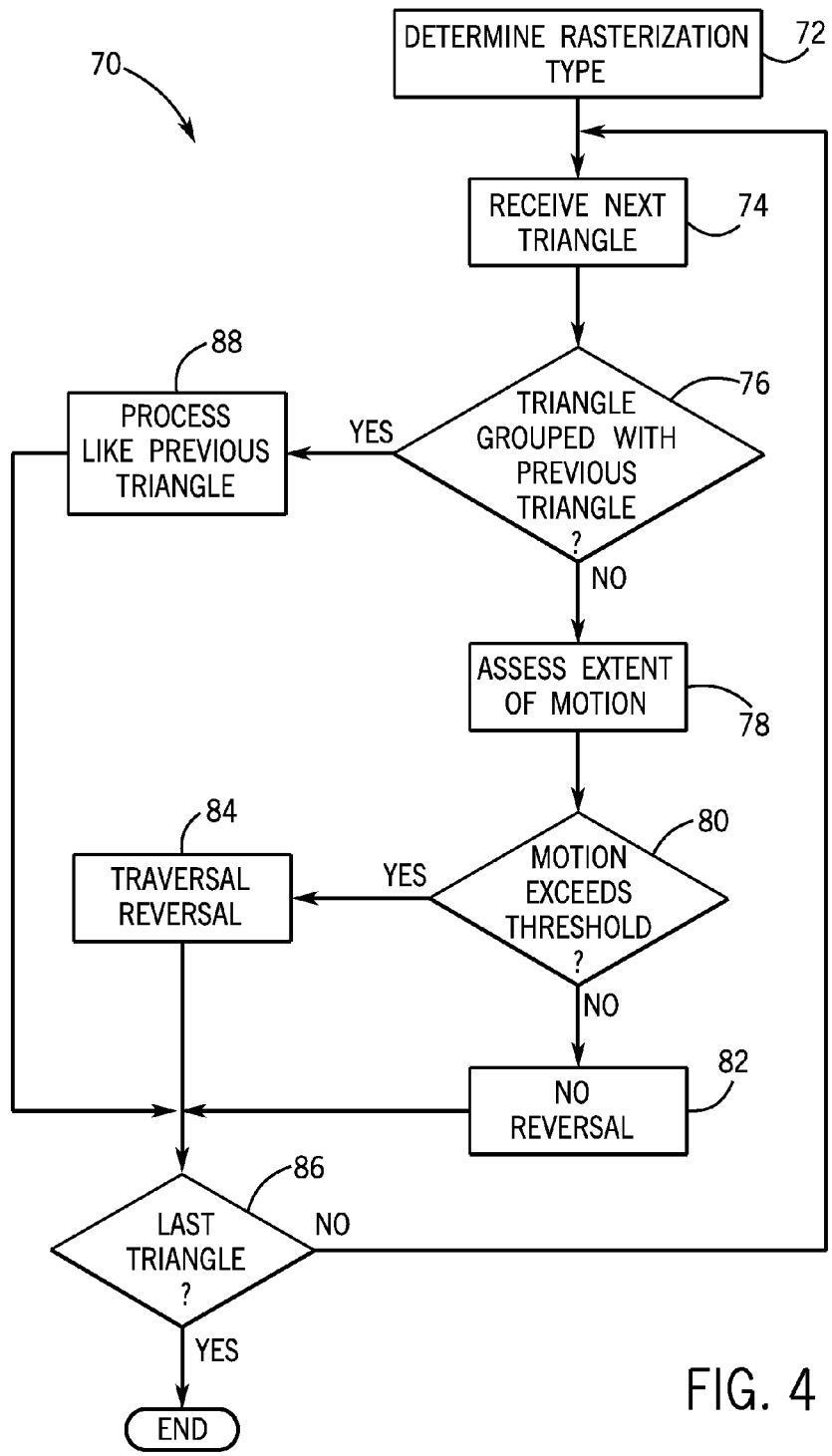
FIG. 4 is a flow chart for one embodiment.

A sequence 70, shown in FIG. 4, for changing the rasterization order for motion blur and depth of field may be implemented in software, firmware, and/or hardware. In software and firmware embodiments, it may be implemented by computer executed instructions stored in one or more non-transitory computer readable media, such as magnetic, optical, or semiconductor storage. In one embodiment, the sequence may be executed in the rasterization unit 40 by using instructions stored in a memory 62.

The sequence 70, shown in FIG. 4, begins by determining, at block 72, the rasterization type. For example, the rasterization type, i.e., the traversal order, may be along a Morton curve or using a normal left or right order traversal. Still another technique is the snake-like traversal.

When the next triangle is received at 74, a check at diamond 76 determines whether the triangle is grouped with the previous triangle. If so, the triangle is processed like the previous triangle, as indicated in block 88.

Otherwise, the extent of motion is assessed, as indicated in block 78. If the motion exceeds the threshold, as determined in diamond 80, the appropriate traversal reversal for the type of rasterization is applied at block 84. But if excessive motion is not found, then no traversal reversal is implemented, as indicated in block 82. The threshold may be set in one embodiment based on the level of screen space motion and cache capacity.

A check at diamond 86 determines whether the last triangle has been processed. If so, the flow ends and, otherwise, the flow returns to block 74.

Figure 5:
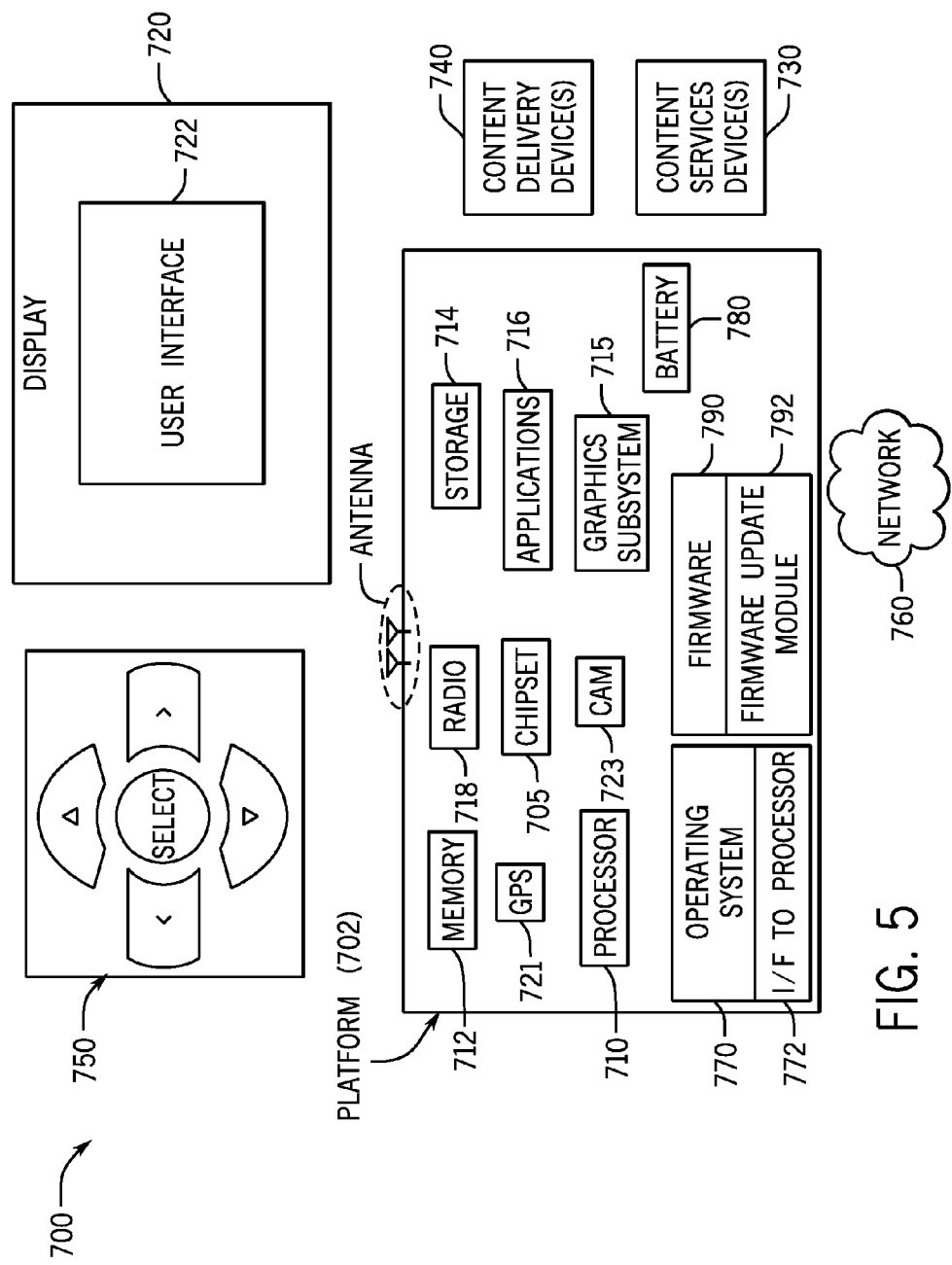
FIG. 5 is a system depiction for one embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 4 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
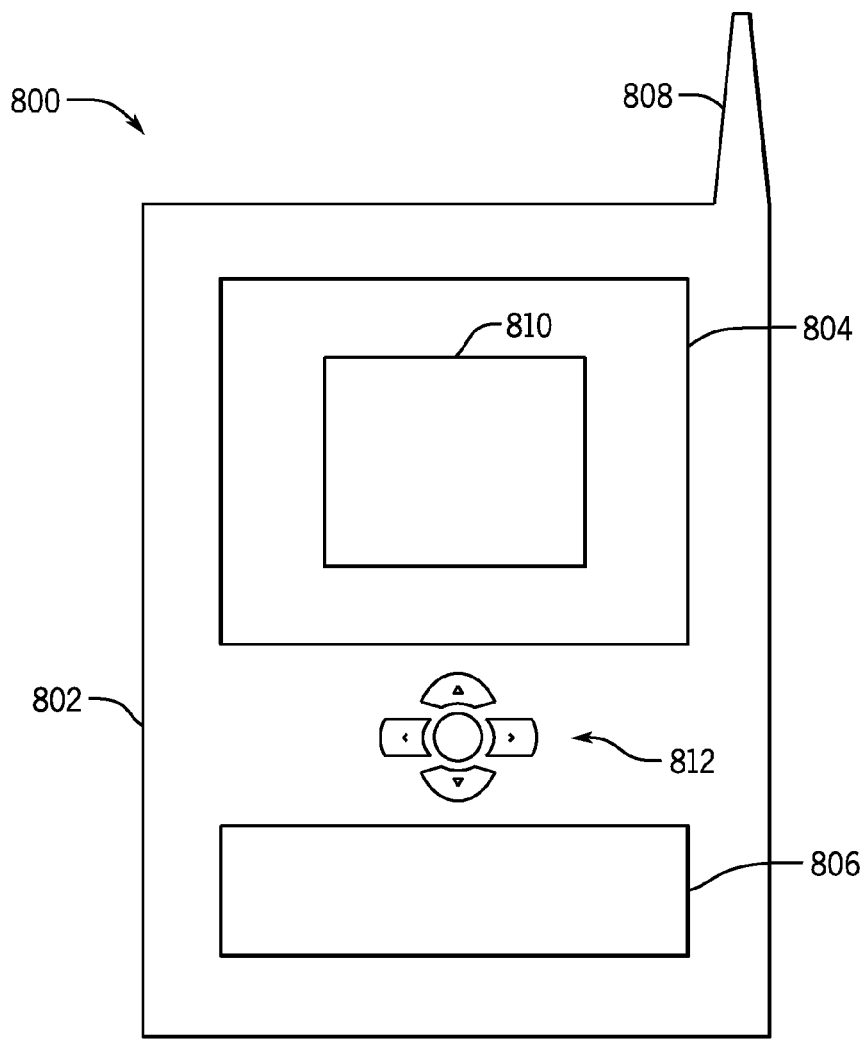
FIG. 6 is a front elevation view for one embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 5 in software and/or firmware embodiments.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

The following clauses and/or examples pertain to further embodiments:

One example embodiment may be a method comprising changing a traversal order after a predetermined number of triangles have been rasterized. The method may also include changing the traversal order on each successive triangle. The method may also include changing the traversal order on each successive group of triangles. The method may also include repeatedly changing the traversal order after each predetermined number of triangles. The method may also include determining an extent of motion and based on the extent of motion deciding whether to suspend a traversal order change. The method may also include altering the traversal order in a scan line traversal. The method may also include altering the traversal order in a Morton curve traversal. The method may also include altering the traversal order when rasterizing for motion blur or depth of field. The method may also include changing traversal order for triangles that are longer and narrower than other triangles for which traversal order is not changed. The method may also include using a traversal reversal for rasterizers that use a snake-like tile based traversal by starting from a bottommost vertex on every other triangle and reversing the left right order.

In another example embodiment may be one or more non-transitory computer readable media storing instructions executed by a computer to perform a sequence comprising changing a traversal order after a predetermined number of triangles have been rasterized. The media may further store instructions to perform a sequence including changing the traversal order on each successive triangle. The media may further store instructions to perform a sequence including changing the traversal order on each successive group of triangles. The media may further store instructions to perform a sequence including repeatedly changing the traversal order after each predetermined number of triangles. The media may further store instructions to perform a sequence including determining an extent of motion and based on the extent of motion deciding whether to suspend a traversal order change. The media may further store instructions to perform a sequence including altering the traversal order in a scan line traversal. The media may further store instructions to perform a sequence including altering the traversal order in a Morton curve traversal. The media may further store instructions to perform a sequence including altering the traversal order when rasterizing for motion blur or depth of field. The media may further store instructions to perform a sequence including changing traversal order for triangles that are longer and narrower than other triangles for which traversal order is not changed. The media may further store instructions to perform a sequence including using a traversal reversal for rasterizers that use a snake-like tile based traversal by starting from a bottommost vertex on every other triangle and reversing the left right order.

Another example embodiment may be an apparatus comprising a processor to change a traversal order after a predetermined number of triangles have been rasterized, and a memory coupled to said processor. The apparatus may also include said processor to change the traversal order on each successive triangle. The apparatus may also include said processor to change the traversal order on each successive group of triangles. The apparatus may also include said processor to repeatedly change the traversal order after each predetermined number of triangles. The apparatus may also include said processor to determine an extent of motion and based on the extent of motion deciding whether to suspend a traversal order change. The apparatus may also include said processor to alter the traversal order in a scan line traversal. The apparatus may also include said processor to alter the traversal order in a Morton curve traversal. The apparatus may also include an operating system, a battery and firmware and a module to update said firmware.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments are described, those skilled in the art will appreciate numerous modifications and variations therefrom. It is intended that the appended claims cover all such modifications and variations as fall within the true spirit and scope of this disclosure.

What is claimed is:

1. A method comprising:
changing a traversal order after a predetermined number of triangles have been rasterized;
determining an extent of motion; and
based on the extent of motion, deciding whether to suspend a traversal order change.

2. The method of claim 1 including changing the traversal order on each successive triangle.

3. The method of claim 1 including changing the traversal order on each successive group of triangles.

4. The method of claim 1 including repeatedly changing the traversal order after each predetermined number of triangles.

5. The method of claim 1 including altering the traversal order in a scan line traversal.

6. The method of claim 1 including altering the traversal order in a Morton curve traversal.

7. The method of claim 1 including altering the traversal order when rasterizing for motion blur or depth of field.

8. The method of claim 1 including changing traversal order for triangles that are longer and narrower than other triangles for which traversal order is not changed.

9. The method of claim 1 including using a traversal reversal for rasterizers that use a snake-like tile based traversal by starting from a bottommost vertex on every other triangle and reversing the left right order.

10. One or more non-transitory computer readable media storing instructions executed by a computer to perform a sequence comprising:
changing a traversal order after a predetermined number of triangles have been rasterized;
determining an extent of motion; and
based on the extent of motion, deciding whether to suspend a traversal order change.

11. The media of claim 10, further storing instructions to perform a sequence including changing the traversal order on each successive triangle.

12. The media of claim 10, further storing instructions to perform a sequence including changing the traversal order on each successive group of triangles.

13. The media of claim 10, further storing instructions to perform a sequence including repeatedly changing the traversal order after each predetermined number of triangles.

14. The media of claim 13, further storing instructions to perform a sequence including determining an extent of motion and based on the extent of motion deciding whether to suspend a traversal order change.

15. The media of claim 10, further storing instructions to perform a sequence including altering the traversal order in a scan line traversal.

16. The media of claim 10, further storing instructions to perform a sequence including altering the traversal order in a Morton curve traversal.

17. The media of claim 10, further storing instructions to perform a sequence including altering the traversal order when rasterizing for motion blur or depth of field.

18. The media of claim 10, further storing instructions to perform a sequence including changing traversal order for triangles that are longer and narrower than other triangles for which traversal order is not changed.

19. The media of claim 10, further storing instructions to perform a sequence including using a traversal reversal for rasterizers that use a snake-like tile based traversal by starting from a bottommost vertex on every other triangle and reversing the left right order.

20. An apparatus comprising:
 a processor to change a traversal order after a predetermined number of triangles have been rasterized, determine an extent of motion and, based on the extent of motion, decide whether to suspend a traversal order change; and
 a memory coupled to said processor.

21. The apparatus of claim 20, said processor to change the traversal order on each successive triangle.

22. The apparatus of claim 20, said processor to change the traversal order on each successive group of triangles.

23. The apparatus of claim 20, said processor to repeatedly change the traversal order after each predetermined number of triangles.

24. The apparatus of claim 23, said processor to determine an extent of motion and based on the extent of motion deciding whether to suspend a traversal order change.

25. The apparatus of claim 20, said processor to alter the traversal order in a scan line traversal.

26. The apparatus of claim 20, said processor to alter the traversal order in a Morton curve traversal.

27. The apparatus of claim 20 including an operating system.

28. The apparatus of claim 20 including a battery.

29. The apparatus of claim 20 including firmware and a module to update said firmware.

* * * * *